Aug. 28, 1956    R. B. OLSEN    2,760,920
SOLAR ENERGY COKING APPARATUS
Filed June 6, 1952    4 Sheets-Sheet 1

Robert B. Olsen
INVENTOR.

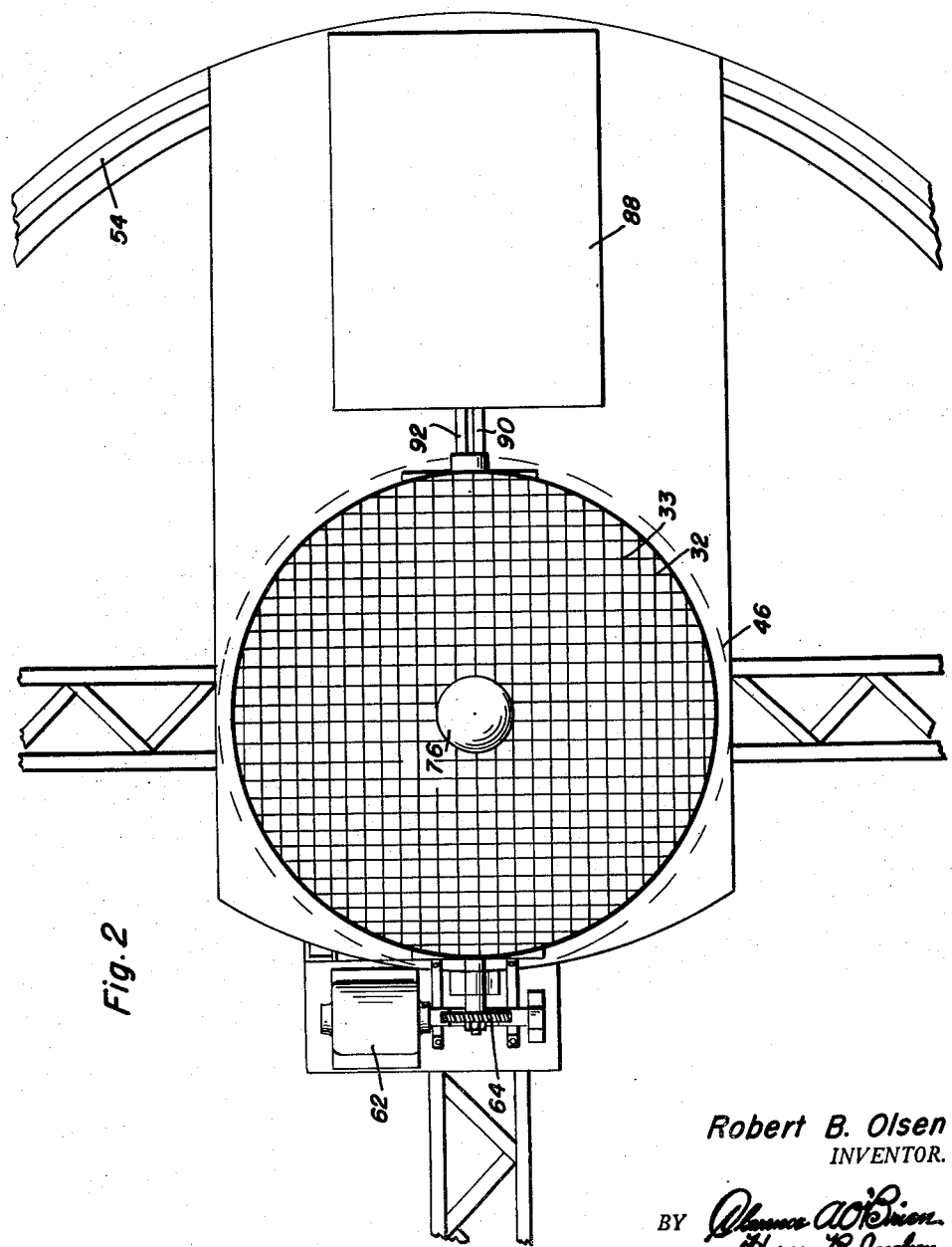

Aug. 28, 1956  R. B. OLSEN  2,760,920
SOLAR ENERGY COKING APPARATUS
Filed June 6, 1952  4 Sheets-Sheet 3
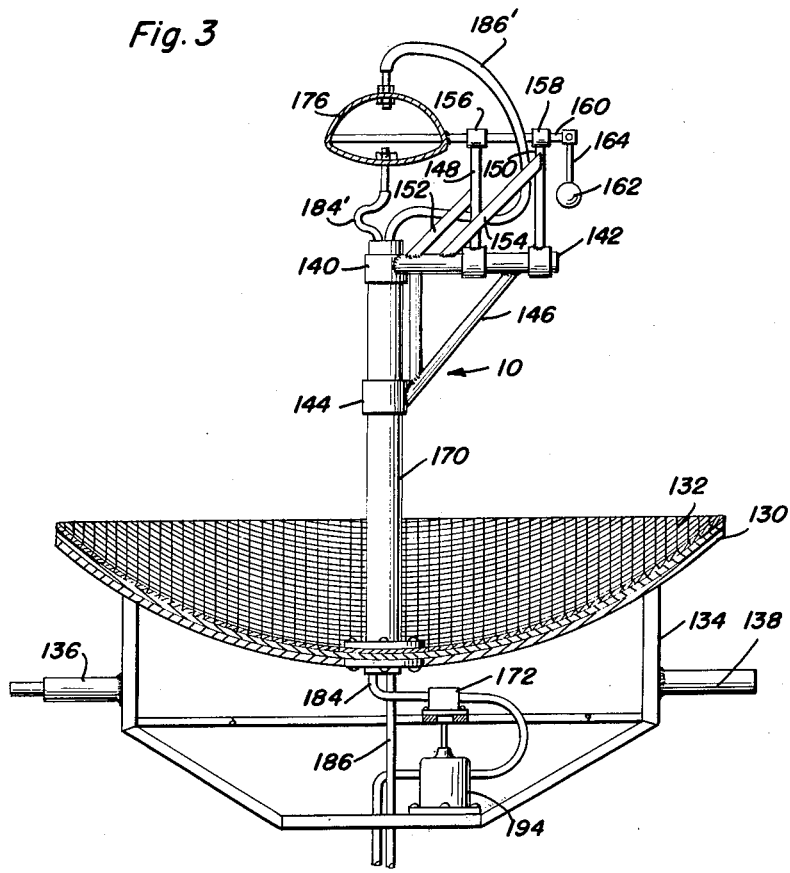
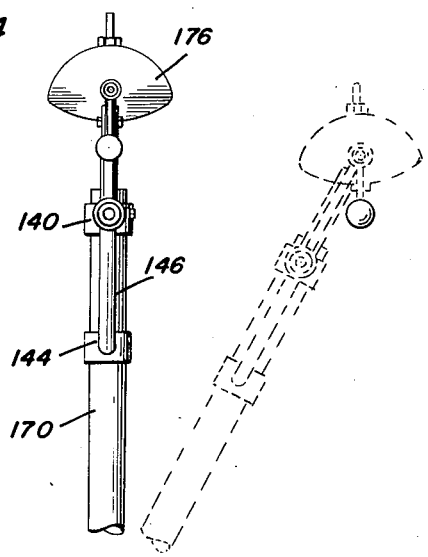
Robert B. Olsen
INVENTOR.

Aug. 28, 1956 R. B. OLSEN 2,760,920
SOLAR ENERGY COKING APPARATUS
Filed June 6, 1952 4 Sheets-Sheet 4
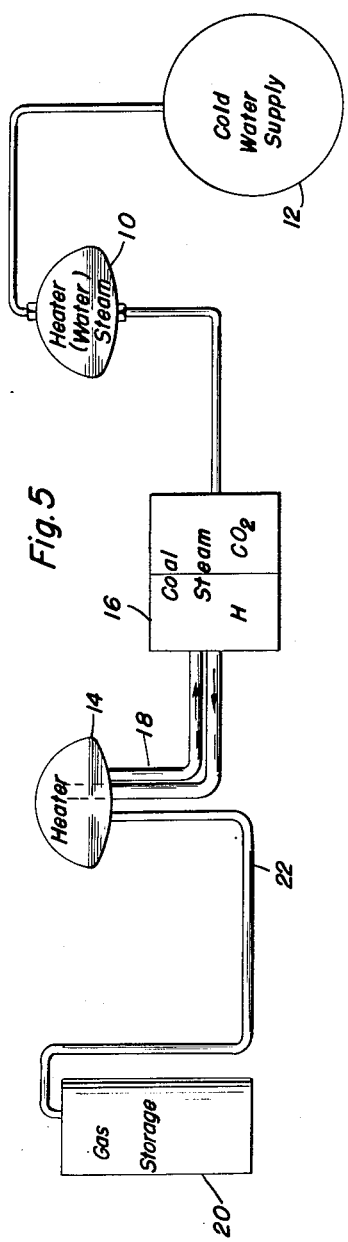
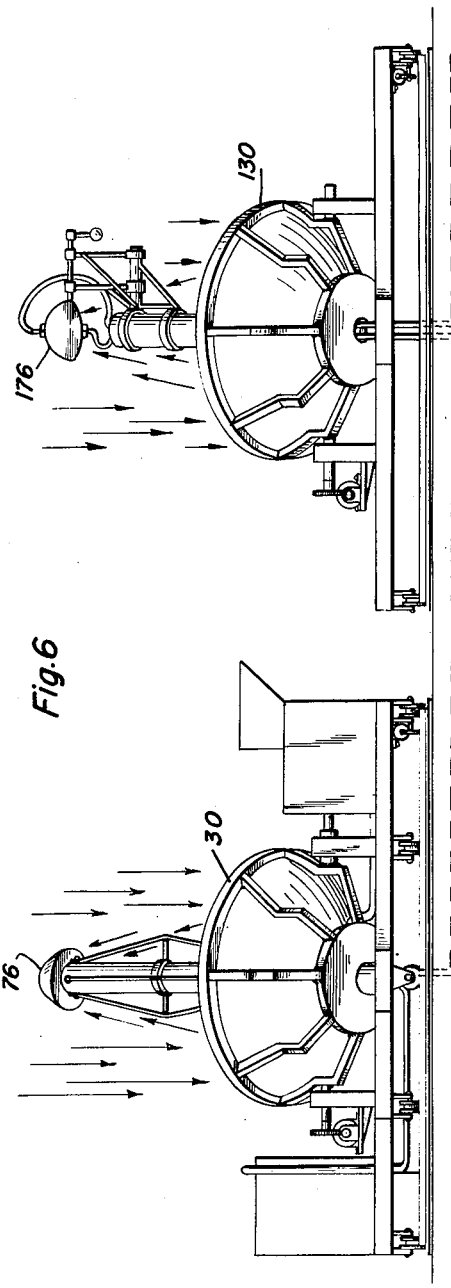
Robert B. Olsen
INVENTOR.

2,760,920

SOLAR ENERGY COKING APPARATUS

Robert B. Olsen, Idaho Falls, Idaho

Application June 6, 1952, Serial No. 292,211

5 Claims. (Cl. 202—96)

This invention relates to a solar energy apparatus and particularly to a solar powered furnace for converting coal and steam to coke and bi-product gases.

A vast almost untapped reservoir of energy lies in the utilization of the direct solar radiation for heating or other purposes. One of the chief difficulties in the utilization of solar energy is the fact that the energy is widely distributed and only small quantities of energy fall on a single area at a single time so that it is necessary to have relatively large collectors or reflectors to collect the solar energy over relatively large areas and to reflect or concentrate at a single point for utilization. Many attempts have heretofore been made to construct such solar energy focusing and utilization devices. The construction and maintenance of the concentrating of the reflecting surfaces for utilizing the energy of a relatively large space on a relatively small adsorber has heretofore been substantially impossible.

The present invention provides a much simplified manner of concentrating the solar energy and of utilizing it after concentration. Instead of constructing a parabolic mirror or a parabolic reflector constructed of a plurality of mirrors which are a sector of a parabolic surface, the present invention utilizes a parabolic surface which is covered or floored over with small flat rectangular mirrors so that relatively small cheap mirrors may be utilized to cover a large area and because of the smallness of the mirrors the individual reflections will be properly focused so they can be received by an absorber mounted above the reflector. A plurality of heat reflecting and absorbing devices are utilized to perform the various steps of the process so that large areas can be utilized in a single process.

It is an object of the invention to provide a sun energy apparatus recovering the sun energy from a large area. It is a further object of the invention to provide a sun apparatus utilizing the energy from various localities to perform different steps in a process. It is a further object of the invention to provide a cheap reflecting surface for sun energy apparatus.

It is a further object of the invention to provide a reflecting surface constructed of flat rectangular mirrors.

Other objects and many of the attendant advantages of the present invention will be apparent from the following detailed description taken in conjunction with the accompanying drawings in which:

Figure 2 is a top plan view of the sun furnace;

Figure 3 is a front elevation of the sun boiler with parts broken away and in section;

Figure 4 is a side elevation of the boiler mounting;

Figure 5 is a schematic lay out of the sun machine; and

Figure 6 is a front elevation of the entire sun machine.

Figure 1:
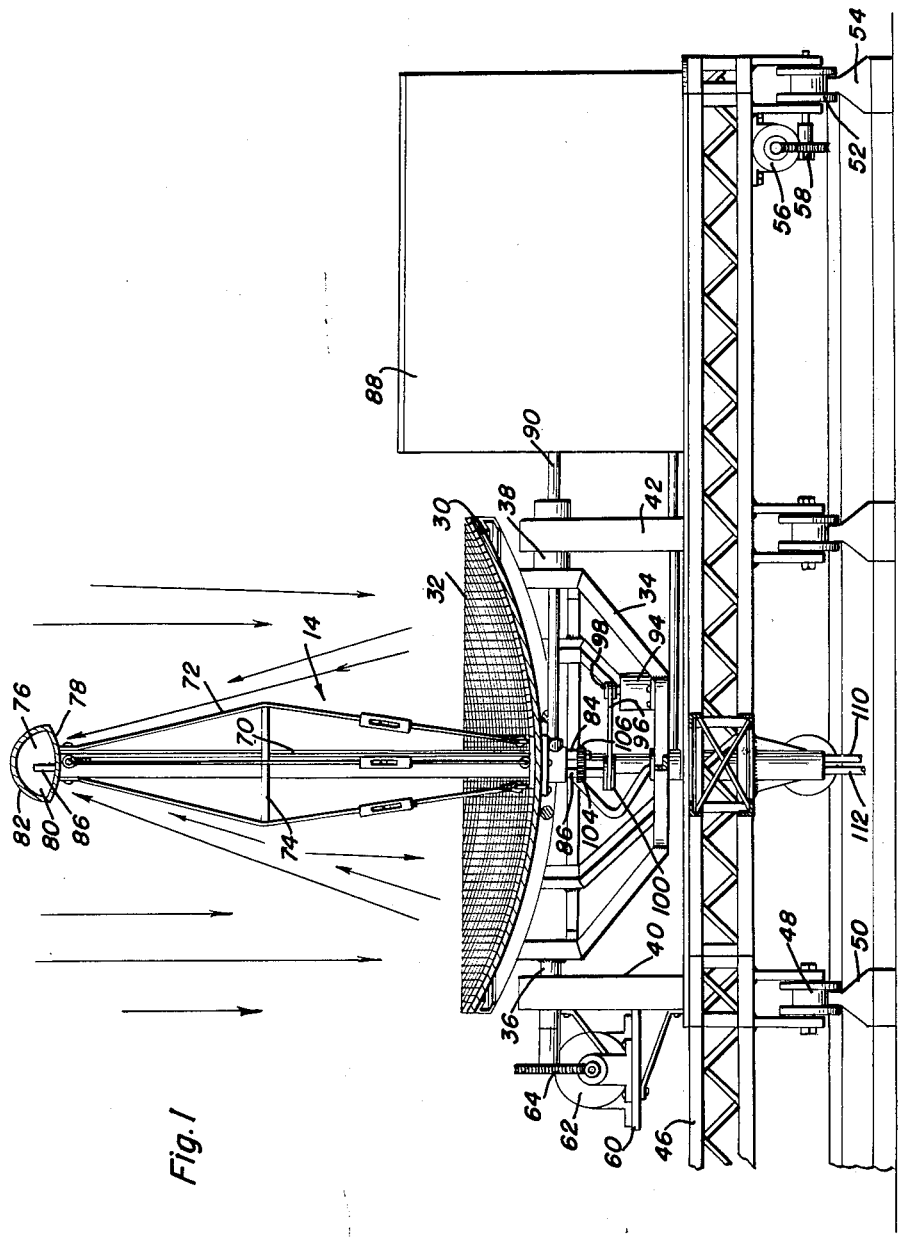
Figure 1 is a front elevation of a sun power coking furnace with parts broken away and in section.

The exemplary embodiment of the solar energy machine comprises a first heater or boiler 10 to which cold water is fed from a suitable source 12. A furnace or heat treating space 14 to which coal is fed from a suitable storage bin 16 and hot water or steam is fed from the heater or boiler 10 and a return pipe 18 from which the solid products of the furnace are returned to the storage bin and a receiver tank 20 to which the gaseous products of the furnace 14 are conducted by suitable conductor 22.

In actual construction of the device the boiler 10 is mounted on a suitable carriage so it can be rotated and tilted so that it is always directly pointed toward the sun. Likewise, the furnace 14 is mounted on a suitable carriage so it also can be rotated while various connections are provided between the various portions of the machine and various arrangements are made for feeding the raw materials into and out of the furnaces and for storing the products.

The sun furnace 14 comprises a base 30 of parabolic shape having a top layer or reflecting surface 32 constructed of individual relatively square or rectangular mirrors 33. The rectangular mirrors are mounted on the parabolic surface 30 by any suitable means preferably by cement.

The parabolic base 30 is mounted on a framework 34 having a pair of diametrically extending axles 36 and 38. The axles 36 and 38 are mounted in suitable bearing standards 40 and 42. The bearing standards 40 and 42 are mounted on a suitable carriage 46 which has a plurality of supporting wheels 48 mounted on an inner circular track 50. The carriage 46 is also provided with outer wheels or drive wheels 52 mounted on an annular track 54. A driving device for the carriage 46 comprises a motor 56 suitably mounted on the carriage 46 and having driving connections with the outside wheels 52.

A bracket 60 is mounted on a portion of the carriage such as the post 40 and a driving motor 62 is mounted on a bracket 60. The motor 62 being provided with driving connections 64 with the axle 36 so that the reflector surface 30 may be tilted about the axles 36 and 38 and together with the rotation of the carriage 46 can be utilized to aim the reflector at any point in the heavens.

The standard 70 is rigidly mounted on and extends through the axis of the reflector surface 30 so that it is movable therewith. Stabilizing braces 72 are connected between the top and bottom of the standard 70 and spaced therefrom on the central portion by means of spacer rods 74, thus providing a complete rigidity of the standard 70 to prevent undesired whip or other motion of the standard 70.

A heat absorber 76 is mounted on the top of the standard 70 and has a heat absorbing surface 78 which is a parabolic surface so that the receiving point on the surface 78 is completely parallel to the transmitting reflecting surface 32 on the surface 30. The heat absorbing surface 78 is preferably substantially a black body so that the heat received will be substantially absorbed and pass into the furnace chamber 80. A heat insulating surface 82 will usually be applied to that portion of the furnace 76 which is remote from the absorbing surface 78 and on which there will be litttle or no incident reception.

A pair of tubes 84 and 86 are mounted in the standard 70 and extend upwardly into the furnace chamber 80. A coal storage bin 88 is mounted on the platform 46 and a pair of conduits 90 and 92 extend therefrom and extend through the axle 38 to a junction with the vertical feed tubes 84 and 86. The coal is fed through one of the conduits such as 90 into a supply tube such as 84 and is carried therethrough by means of suitable conveyors preferably of the spiral screw-type. The return products are returned through the opposite conveyor tube, such as 86, and through the conduit 92 back into the receiver box 16. The conveyors in the tubes 84 and 86 being of the spiral type are connected to a drive motor 94 by means of a belt 96 entrained over sheaves 98 on the motor 94 and a sheave 100 on the conveyor in the tube 86. A pair of spur gears 104 and 106 are connected on the spiral conveyors in the tubes 84 and 86 and are in mesh with each other so that the spiral conveyors run in opposite directions in the tubes. Similar conveyors may be provided in the conduits 90 and 92 so that coal may be fed from the bin 88 into the furnace chamber 80 and the coke products may return from the chamber 80 into the storage compartment 16. The steam conduit 110 extends to a steam boiler presently to be described and a gas conduit 112 extends to the gas storage tank.

The steam generator boiler provides a surface of parabolic form such as the base 130 having a mirrored surface 132 composed of rectangular mirrors 33. A standard 170 is mounted in the axis of the parabolic base 130 and has a heat absorber device 176 mounted at the top thereof. The parabolic base 130 is mounted on a frame 134 having diametrically opposed axles 136 and 138. The axles 136 and 138 are mounted on a carriage substantially identical with the carriage 46 and are operable in substantially and identically the same manner.

A supporting bracket for the boiler 176 comprises a collar 140 to which is attached an extending arm 142 and a collar 144 to which is attached a brace member 146 for rigidifying the arm 142 with respect to the column 170. A pair of upstanding arms 148 and 150 are mounted on the arm 142 and are rigidly braced with respect thereto by means of braces 152 and 154. At the tops of the arms 148 and 150 are bearings 156 and 158. A shaft 160 is mounted in the bearings 156 and 158 and is rigidly connected to the boiler 176. A weight 162 at the end of a balance arm 164 is operative to maintain the boiler 176 in an upright position. A feed tube 184 extends upwardly through the shaft 170 and is connected to the furnace 176 by means of a flexible tube 184'. A steam pipe 186 extends through the shaft 170 and is connected into the top of the furnace 176 by means of a flexible portion 186'. Water from any suitable source is fed through the conduit 184 by means of a pump 172. In the operation of the device according to the invention water is pumped into the boiler 176 and converted into steam and transferred through the conduit 186 into the conduit 110 and upwardly into the furnace 76. Simultaneously raw coal is fed from the bin 88 through the conduits into the furnace 76 and the reflectors 130 and 30 are so oriented that the sun's beams fall directly onto the reflector surfaces 32 and 132 and are directed upwardly by the mirrors 33 onto the parabolic surfaces of the heat absorber devices so that the heat of the reflector 132 is applied to the boiler 176 to produce steam for the process which steam is fed into the furnace 76 where the heat from the reflector 32 produces coke and gas which is fed out of the furnace 76 into the storage bin 16 where the gases are separated and placed in gas storage.

It will be apparent that the present invention provides a compact and easily operated means for directing solar energy into useful channels so that the solar energy may be directly recovered without intermediate chemical actions.

For purpose of exemplification a particular embodiment of the invention has been shown and described according to the best present understanding thereof. It will be apparent to those skilled in the art that many changes and modifications can be made therein without departing from the true spirit of the invention.

Having described the invention, what is claimed as new is:

1. A sun power coking furnace comprising a parabolic reflector base, said reflector base being covered by a plurality of separate mirrors, each of said mirrors being flat and of rectangular shape, a columnar standard mounted axially of said reflector, a heat absorber mounted on said standard at the focal point of said reflector, a source of steam, a feeder tube delivering steam to said absorber and connected thereto, a second feeder tube connected to said absorber, a conveyor operatively connected with said second tube for delivering coal to said absorber through said second tube, an outlet tube connected at one end to said absorber, and a spiral conveyor connected with said outlet tube for removing coke and gases from said absorber through said outlet tube.

2. A sun power furnace comprising a base formed as a paraboloid of revolution, a carriage, a pair of bearings on said carriage, horizontal axles secured to said base and journaled in said bearings, a motor connected in driving relation to said axle to rotate said base about said horizontal axles, a standard mounted axially of said base, a reflecting surface on said base, said surface composed of flat rectangular mirrors, a heat absorbing chamber mounted on said standard at the focal point of said surface, a circular track, wheels attached to said carriage and mounting said carriage on said track, means operatively connected to said carriage for propelling said carriage on said track, a pair of conduits extending longitudinally of said standard and connected to said chamber to feed and deliver from said chamber, helical feeders mounted in each of said conduits, driving gears on said feeders, said gears being in mesh, and means to rotate one of said gears whereby said feeders rotate in opposite directions.

3. A coking system comprising a pair of sun reflectors, each of said reflectors including a parabolic base, a plurality of separate mirrors covering the surface of said reflector base, each of said mirrors being flat and of rectangular shape, a columnar standard mounted axially of said reflector, a heat absorber mounted on said standard at the focal point of said reflector, pumping means operatively connected to one of said absorbers to deliver water thereto, a screw conveyor operatively connected with the other absorber to deliver coal thereto, a steam conduit interconnecting said absorbers, and an output conveyor connected to said other absorber.

4. A sun furnace comprising a reflector including a plurality of rectangular flat mirrors arranged in parabolic form, a standard rising above said reflector, a furnace carried by said standard and mounted at the focus of said reflector, said furnace having a heat absorbing surface exposed to said reflector and an insulating surface on that part of the furnace away from said reflector, the absorbing surface of said furnace being in the form of a parabola that is substantially parallel to said reflector, an inlet tube, an outlet tube, both said tubes being connected to said furnace and extending through said standard, and a spiral conveyor in said inlet tube for charging said furnace through said inlet tube.

5. A coking system comprising at least two sun reflectors, heat absorbers disposed in the focal planes of said reflectors, pumping means connected to a first of said absorbers for delivering water thereto, conduits connected to said absorbers for delivering steam from said one to another of said heat absorbers, means including an auger connected to a second of said absorbers for delivering coal thereto, and means including a second auger connected with said second absorber for delivering coke therefrom.

References Cited in the file of this patent

UNITED STATES PATENTS

| | | |
|---|---|---|
| 260,657 | Calver | July 4, 1882 |
| 603,317 | Calver | May 3, 1898 |
| 797,891 | Himalaya | Aug. 22, 1905 |
| 811,274 | Carter | Jan. 30, 1906 |
| 1,814,897 | Coxe | July 14, 1931 |
| 1,901,169 | Karrick | Mar. 3, 1933 |

(Other references on following page)

UNITED STATES PATENTS

| | | |
|---|---|---|
| 2,182,222 | Courtis et al. | Dec. 5, 1939 |
| 2,276,342 | Records et al. | Mar. 17, 1942 |
| 2,413,101 | Delano | Dec. 24, 1946 |
| 2,455,834 | Ushakoff | Dec. 7, 1948 |
| 2,549,117 | Nelson | Apr. 17, 1951 |

FOREIGN PATENTS

| | | |
|---|---|---|
| 824,726 | France | Nov. 18, 1937 |

OTHER REFERENCES

"Coal Carbonization," by Roberts, pages 67–72, Pitman & Sons (London), 1927.